May 18, 1937.  J. H. GRAHAM  2,081,035
SIGNALING OR INDICATING APPARATUS
Filed July 11, 1929  9 Sheets-Sheet 1

Inventor
Joshua H. Graham
by Herbert N. Brunner,
Attorney.

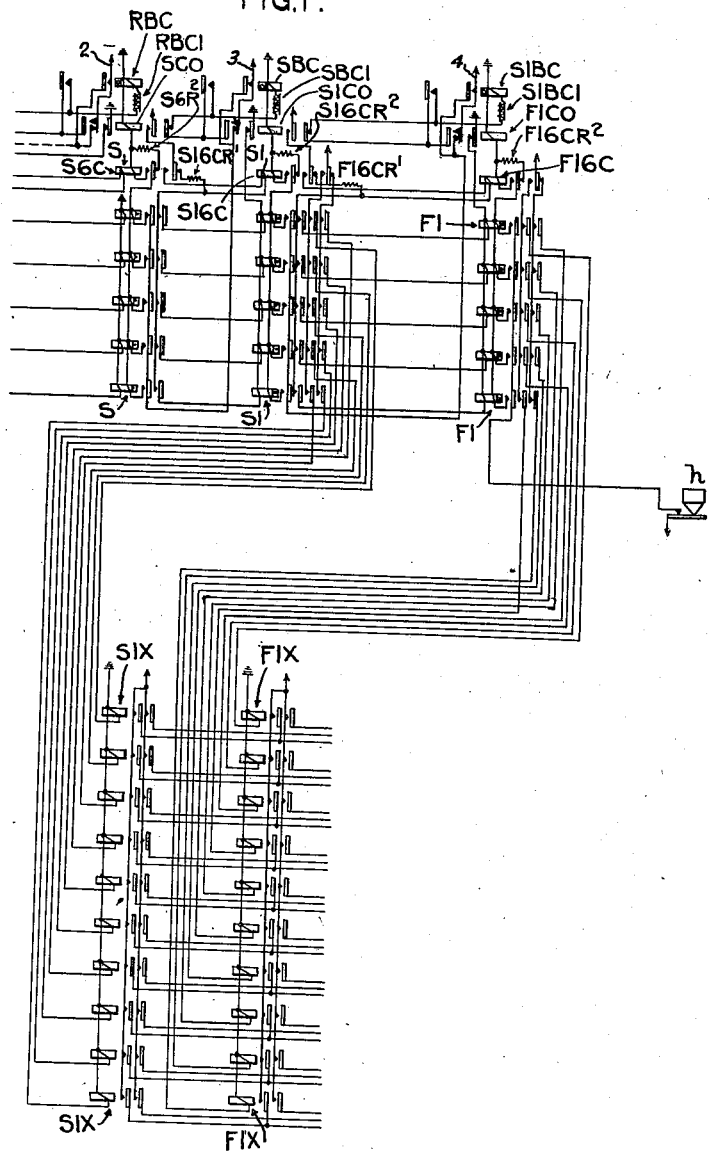

May 18, 1937.	J. H. GRAHAM	2,081,035
SIGNALING OR INDICATING APPARATUS
Filed July 11, 1929	9 Sheets-Sheet 3
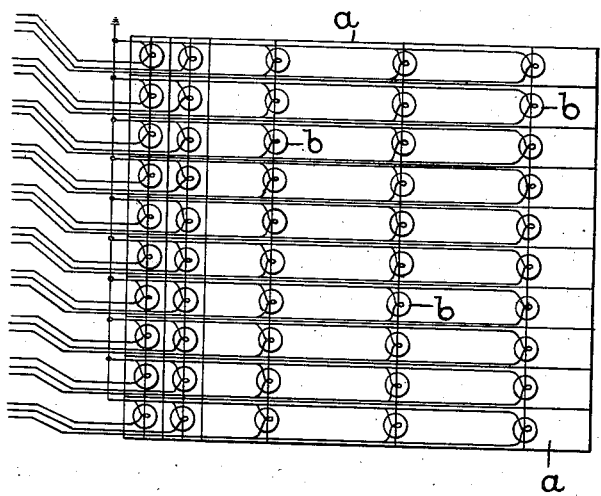

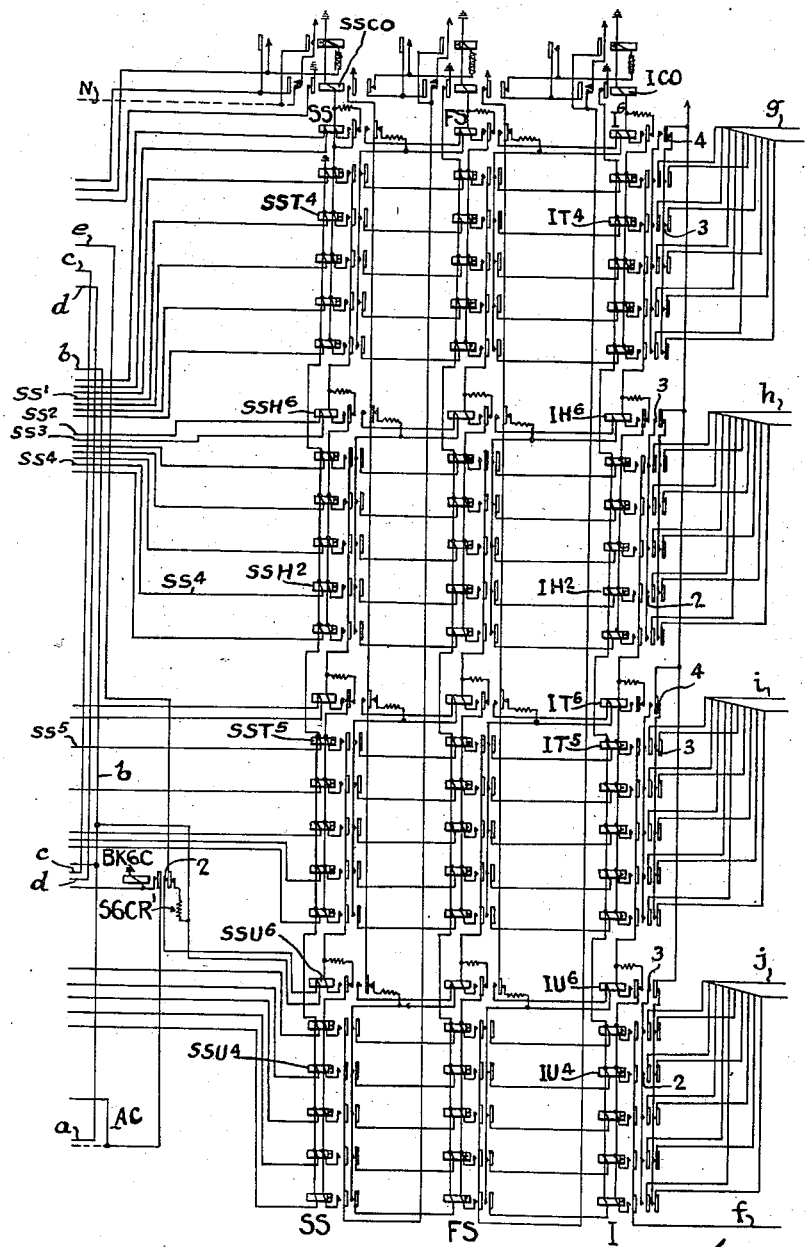

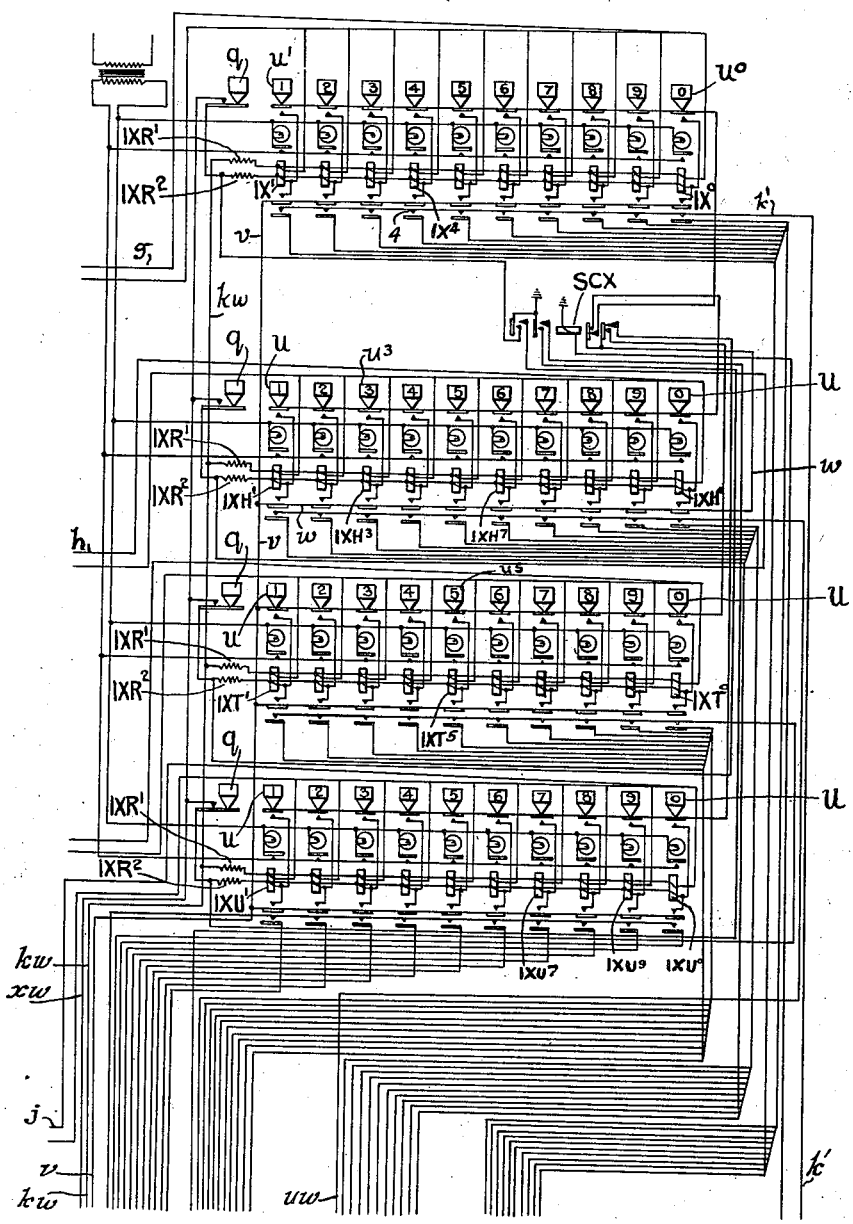

May 18, 1937.   J. H. GRAHAM   2,081,035
SIGNALING OR INDICATING APPARATUS
Filed July 11, 1929   9 Sheets-Sheet 7
FIG. 3⁣ᶜ
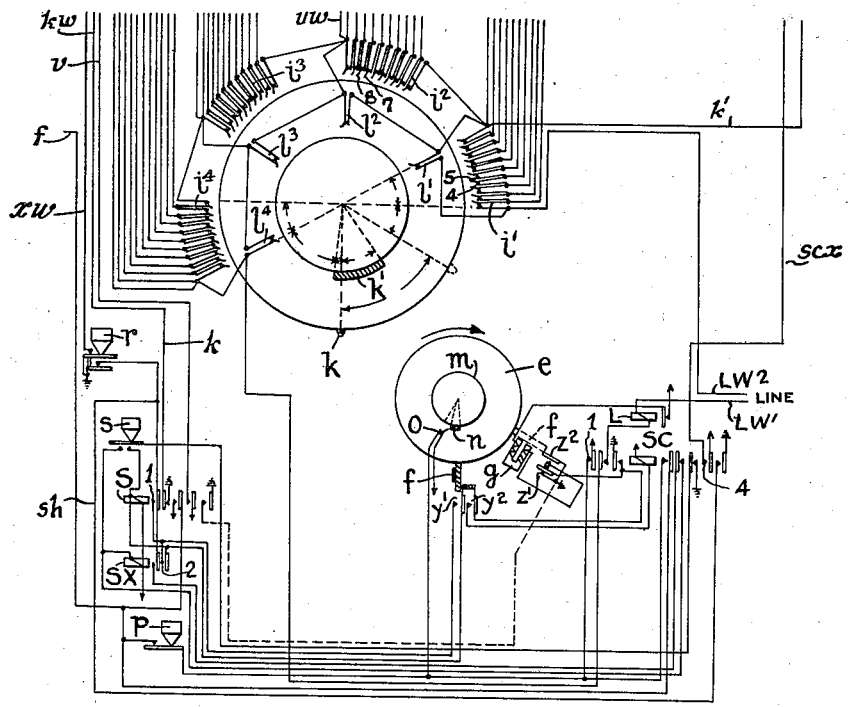
FIG. 5.
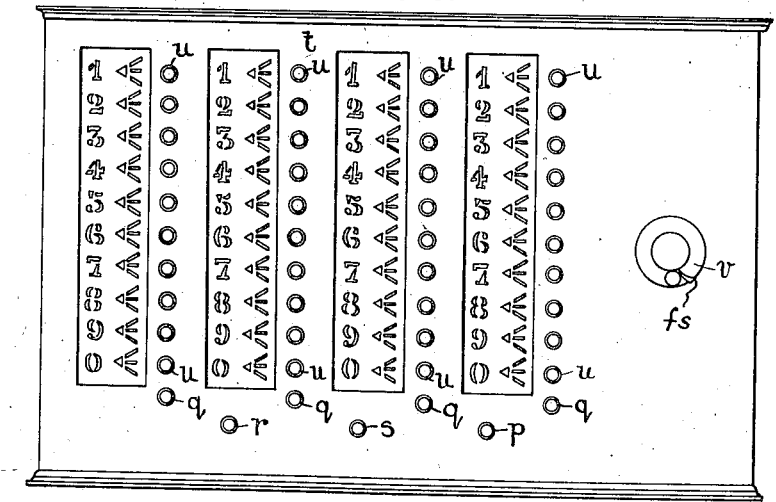
Inventor,
Joshua H. Graham
by Herbert W. Jenner
Attorney.

May 18, 1937.  J. H. GRAHAM  2,081,035
SIGNALING OR INDICATING APPARATUS
Filed July 11, 1929   9 Sheets-Sheet 8

Inventor
Joshua H. Graham
by Herbert W. Jenner,
Attorney.

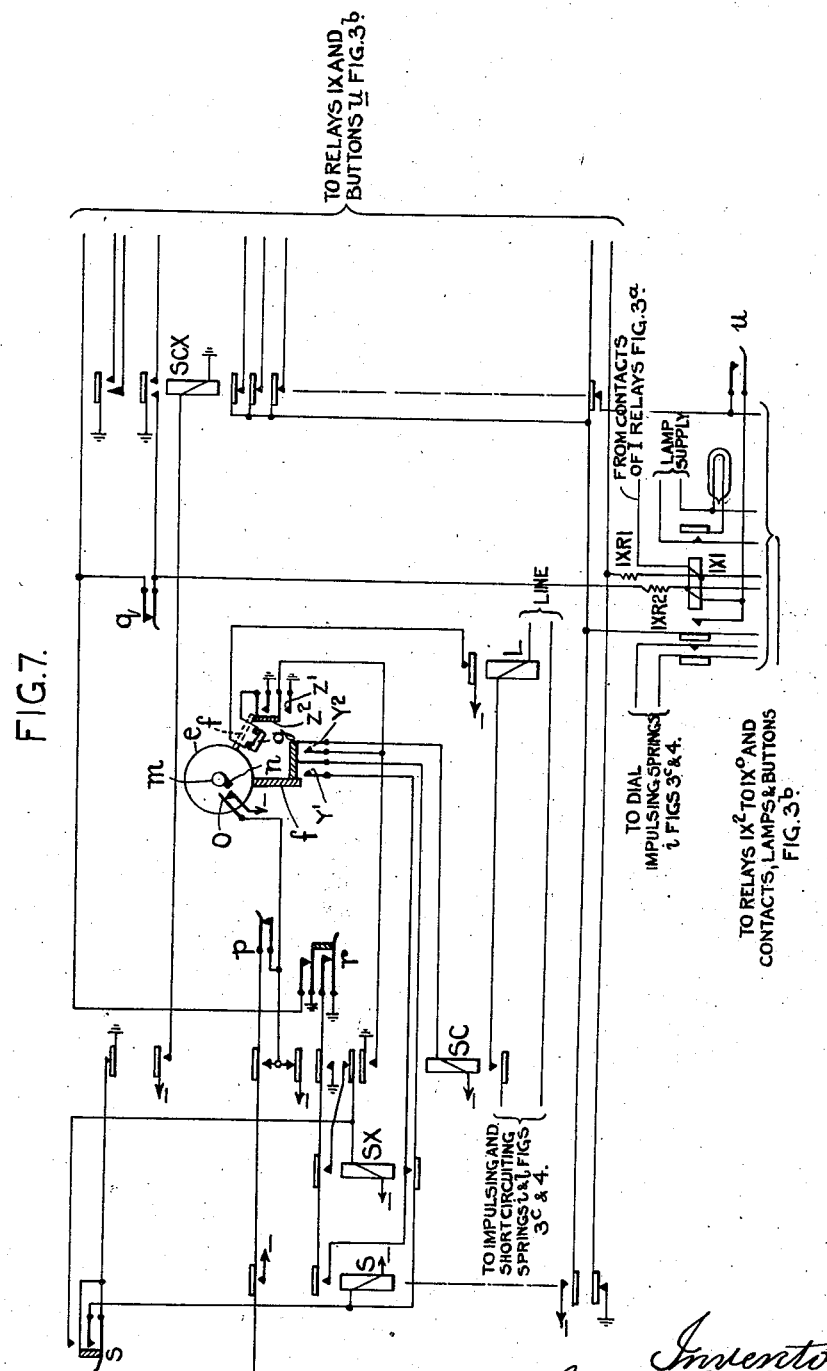

Patented May 18, 1937

2,081,035

UNITED STATES PATENT OFFICE 2,081,035

SIGNALING OR INDICATING APPARATUS

Joshua Heap Graham, Fisherton, Argentina, assignor, by mesne assignments, to Automatic Electric Company Limited, Liverpool, England Application July 11, 1929, Serial No. 377,433
In Great Britain August 1, 1928

17 Claims. (Cl. 177—353)

This invention relates to signaling or indicating apparatus principally for the purpose of transmitting from one position or station to another for instance from one signal cabin to another on a railway, descriptions or particulars of trains passing from the transmitting to the receiving station or from one signal cabin to another where the descriptions are shown on an appropriate indicator or panel, the apparatus being such that the descriptions or indications may be received and displayed at the receiving cabin or station in the order in which they were transmitted from the sending cabin or station, and further such that if two or more descriptions or indications are successively transmitted from the sending cabin or station the second and subsequent descriptions are stored in the apparatus at the receiving cabin and are only transferred to or displayed on the indicator when required or when the indicator is free to receive and display same. Apparatus of this character may also be employed for the purposes of indicating to passengers, on an appropriate indicator board, at terminal stations, particulars of trains arriving at and departing from the station, for instance platform numbers, times of arrival and departure, and other information usually given to passengers. Further the apparatus may be employed for indicating to passengers at any intermediate station the destinations of a number of trains successively approaching the station.

Usually, in the case of sending descriptions of trains from one signal cabin to another, the descriptions to be displayed on the indicator at the receiving cabin consist of numbers which represent trains proceeding to predetermined known destinations or stations, or proceeding on certain routes.

Signaling or indicating apparatus for the purposes above set forth has heretofore been proposed and employed, and it is the principal object of the present invention to provide improved apparatus of the character or for the purposes indicated above. With this object in view the apparatus according to the present invention is such that the cost of installation and maintenance is considerably reduced, and the apparatus is also simple and more reliable in use, and there are no heavy parts or mechanisms requiring mechanical actuation.

Signaling apparatus for the purposes set forth and comprising electrically operated and controlled receiving apparatus and an indicator according to this invention is characterized in that the said receiving apparatus comprises a common recording means whereon a plurality of different signals or descriptions relating to different trains, transmitted successively to the said receiving apparatus, are successively recorded, the said common recording means being adapted to be influenced or actuated to record a signal or description by a succession of electric impulses or by one or more series of such impulses transmitted from a transmitting station, electrical means for receiving and storing signals transferred from the said recorder, and means for displaying a signal or signals on the indicator.

Further according to this invention the abovementioned receiving apparatus comprises in combination a first apparatus adapted to be actuated by and to count one or more series of electric impulses (or impulses of electric current) and thus to set up or record a signal received, a second apparatus the operation of which is controlled by the first apparatus so that on cessation of the counting operation performed by the first apparatus the signal is transferred from the first apparatus to the said second apparatus and said first apparatus is freed, and a further or final apparatus the operation of which is controlled by the said second apparatus so that the signal is transferred from the said second apparatus to the said final apparatus and the second apparatus is freed, the said final apparatus, and it may be the said second apparatus controlling or effecting the display of signals transferred thereto.

Further according to this invention the abovementioned first apparatus comprises a plurality of sets or groups of electric relays or electromagnetically operated contact devices with appropriate contacts controlled thereby and electric circuits controlled by said contacts which serve for recording signals received, the second apparatus comprises another set or sets of relays or electro-magnetically operated contact devices, which serve for storing descriptions, and the further or final apparatus comprises another set or sets of relays or electro-magnetically operated contact devices which serve for causing the descriptions to be displayed on the indicator, and, associated with the said sets or groups of relays or electro-magnetically operated contact devices and their contacts, other relays or electro-magnets with appropriate contacts and circuits controlled thereby and which serve for transferring descriptions from the first or recorder set of relays or electro-magnetically operated contact devices to the next or storage set or sets and from the latter to the further or final set or sets of relays or electro-magnetically operated contact devices and thus to the indicator.

Apparatus according to this invention further comprises means for transmitting signals or descriptions received at one station or signal cabin to another station or cabin, the said means having associated with it other means whereby operation of the transmitting means for transmitting a signal cancels or removes the indication of the description from the receiving apparatus at the first-mentioned cabin or station. The receiving apparatus also comprises means for cancelling or removing from the indicator a description of a train which is not to proceed to another or distant cabin or station.

Further according to this invention the receiving apparatus at an intermediate station or signal cabin comprises apparatus for interpolating in a series of signals or descriptions passing through the receiving apparatus at the intermediate station or signal cabin to a distant station or cabin, a description appertaining to a train which commences its journey at the said intermediate station or signal cabin (for example, a train that has come from a siding or branch line) the said apparatus comprising means whereby the interpolated signal can be set up by the signalman and means whereby it can be transmitted by him from the said intermediate station or signal cabin to the distant station or signal cabin, and the receiving apparatus also preferably comprises means for suppressing from the indicator a number or description received in the receiving apparatus, means for setting up and interpolating another number or description on the indicator of the receiving apparatus in the said signal cabin and means for transmitting the said interpolated number to the receiving apparatus at the next or a distant signal cabin, the said means being such that the action of transmitting the said interpolated number automatically cancels it from the indicator in the first-mentioned signal cabin and causes the suppressed number to be displayed on the said indicator.

Further the receiving apparatus at a first or intermediate station or signal cabin comprises or has associated with it means whereby signals received and displayed by the apparatus at the said station or signal cabin can be transmitted to the apparatus at another or distant station or signal cabin, and means whereby if the receiving apparatus at the distant station or cabin is full, i. e. has no capacity for receiving another or further signal or description, the said transmitting means is rendered ineffective for transmitting a signal or description to the receiving apparatus at the distant station or cabin but when the receiving apparatus at the distant station or cabin becomes free to receive another signal or description the said transmitting means at the first or intermediate station or cabin becomes effective for transmitting the signal or description to the distant station or cabin.

As above-mentioned the invention may be employed for displaying selected indications on an indicator provided on a railway platform for indicating the order and destinations of trains successively approaching the platform. Such an indicator may have on it say ten destinations and the arrangements may be such as to cause two of these destinations to be indicated or displayed at the same time with numbers or digits indicating the order in which the trains for the indicated destinations will arrive at the platform. This would be a comparatively simple application of the invention. The apparatus according to this invention is, however, such that the number of descriptions or indications to be dealt with may be indefinitely increased it being only necessary to provide the requisite number of groups of electro-magnetically operated contacts or relays according to requirements. An example of such an enlarged application of the invention would be for transmitting descriptions of trains to signal cabins and from signal cabin to signal cabin along a railway, these descriptions being, as already mentioned, usually predetermined numbers appertaining to particular trains or to trains for particular destinations. In this application of the invention it is usually only necessary to display one description or indication on the indicator at a time.

Other features of the apparatus according to this invention are hereinafter described and set forth in the appended claims.

Figs. 1, 1$^a$ and 1$^b$ of the accompanying drawings together form a diagram illustrating a relay storing indicator embodying the invention for ten descriptions.

Fig. 2 is a front view of the ten-description indicator board.

Figs. 3, 3$^a$, 3$^b$ and 3$^c$ together form a diagram of a combined receiver, indicator, and transmitter for intermediate stations.

Figs. 5 and 6 illustrate forms of indicators suitable for use at intermediate cabins.

Fig. 7 is a simplified diagram illustrating devices and arrangements shown in Figs. 3$^b$ and 3$^c$ hereinafter referred to.

Figure 1:
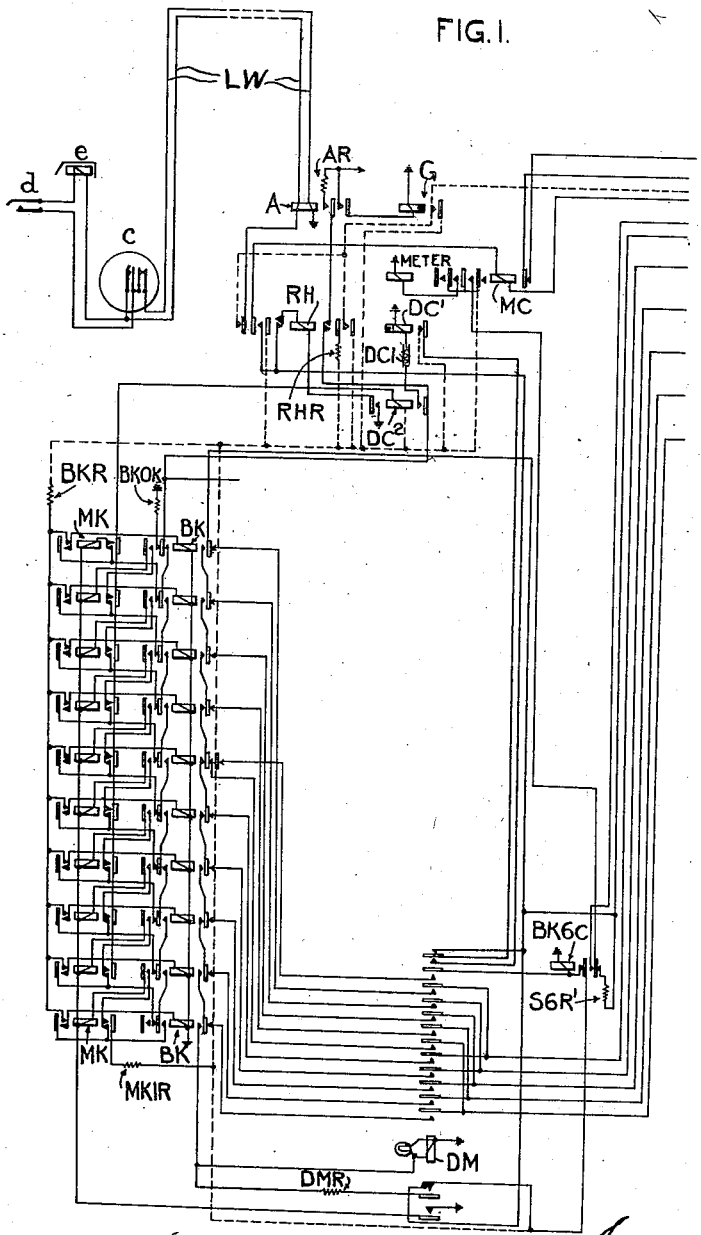

Referring to the simpler embodiment of the invention illustrated in Figs. 1, 1$a$, 1$b$ and 2. namely an indicator on a railway platform to indicate the order and destination of trains arriving at the platform, the indicator $a$ may comprise the names of say ten train destinations arranged one above the other and associated with these train destinations the numerals 1 and 2 for each destination, electric lamps $b$ being provided for illuminating the destinations and numerals. The general operation is as follows: For example as soon as two descriptions have been successively set up on the recorder, or BK and MK, relays as hereinbefore-mentioned and transferred therefrom through the storage or S relays to the second and first or SI and FI indication relays, these indications are, by the operation of the FI and SI relays also set up on the final set or auxiliary relays SIX and FIX respectively. The setting up of the indication on the FIX relays by the operation of the appropriate or prearranged one of these relays supplies current to illuminate the corresponding description or destination and the numeral 1 thus indicating the destination of the first train to arrive at the platform. Similarly in the case of the SIX relays the operation of the appropriate or prearranged relay illuminates the corresponding destination and its numeral 2, thus indicating the destination of the second train approaching.

When the first train passes out of the station a cancelling button or contact $h$ is operated, it may be by the train itself, and the first indication carried on the FI and FIX relays and given on the indicator is cancelled and the indication set up by the SI and SIX relays automatically steps up on to the FI and FIX relays. The above-mentioned cancellation of course also removes the visible indication on the indicator $a$, and the stepping up of the second description, indication or destination on to the FI and FIX relays and its removal from the SI and SIX relays causes the numeral 2 appertaining to this description or destination to be cancelled and the numeral 1 to be displayed. Assuming that more than two descriptions have been set up in the apparatus, the third description stored on the S or storage relays would, on cancellation of the first description or indication, automatically step up on to the SI or second indication relays, and if a fourth indication or description had been set up and held on the recorder or BK and MK relays the fourth description would automatically step up from the recorder to the S relays. The circuit and contact arrangements of the apparatus are such that under these conditions the apparatus would be in condition to receive another indication or description and the operator's indicator in connection with the initiating key or switch $d$, Fig. 1, would show this. When the apparatus or relay system is filled up, namely when the recorder relays, storage relays and the second and first indication relays are occupied by descriptions the operator's indicator relay $e$, Fig. 1, indicates this condition of the apparatus and that it cannot take another description.

The diagram, in conjunction with the following brief description of the various circuits and relays, will render the operation of the system perfectly clear to those skilled in the art, and to facilitate the reading of the diagram it may be well to enumerate the following elements of the system, namely;—FI—first indication relays; FI6C—first indication change-over relay; FICO—first indication cut-off relay; FIX—first indication auxiliary relay; FI6CR$^1$—first indication change-over control resistance; FI6CR$^2$—first indication change-over holding resistance; SIBC—second indication battery control relay; SIBCI—second indication battery control impedance; SI—second indication relay; SIX—second indication auxiliary relay; SICO—second indication cut-off relay; SI6CR$_2$—second indication change-over holding resistance; SI6C—second indication change-over relay; SI6CR$^1$—second indication change-over control resistance; SBC—storage battery control relay; SBCI—storage batery control impedance; S—storage relay; S6C—storage change-over relay; SCO—storage cut-off relay; S6R$^1$—storage change-over control resistance; S6R$^2$—storage change-over holding resistance; RBC—recorder battery control relay; RBCI—recorder battery impedance; MC—marker control relay; G—guard relay; A—impulse relay; AR—impulse resistance; DC$^1$—digit control relay; DC$^2$—digit control relay; DCI—digit control impedance; RH—recorder holding relay; RHR—recorder holding resistance; MK—marking impulse counting relay; MKIR—marking impulse counting resistance; BK—break impulse counting relay; BKR—Break impulse counting resistance; BKOK—break impulse counting auxiliary resistance; DM—digit marker relay; DMR—digit marker resistance; BK6C—sixth break registering relay; $c$—the dial; $d$—the key which is operated to commence working, and $e$—the indicator relay.

LW indicates the two conductors or line wires extending between the transmitting and the receiving apparatuses or between stations or signal cabins, and through which all operations for receiving, storing and displaying signals in the receiving apparatus are controlled.

A number of the relays are designed in known manner to operate rather more slowly than the others. These slow-operating relays are indicated by a small rectangle containing a circle. One of the relays, namely the guard relay G, which is partly cross-hatched in the diagram, is a "slow releasing" relay so that it remains operated notwithstanding that its circuit is rapidly opened and closed. Such slow-releasing relays are well known.

Briefly the operation of the apparatus shown in Figures 1, 1$^a$, and 1$^b$ is as follows, assuming it to be at rest.

It will be assumed that the operator wishes to indicate that the first train to arrive at the station, at which is situated the indicator $a$ (Figs. 1$^b$ and 2), will be for Encomiendas. The numerical code appropriated to this destination is 4 and requires that the operator send four impulses, or rather, as is well understood in the automatic telephone art and industry, that he should interrupt an existing circuit four times. To this end the operator closes switch $d$ (Fig. 1) thus completing the following circuit; negative at point 2, (Fig. 1$^a$), by way of unoperated contacts of relay SCO, chain line joining Figures 1$^a$ and 1, unoperated contacts of relay RH, left-hand winding of relay A, one wire of the line circuit LW joining the two stations, indicator relay $e$, switch $d$, the normally closed impulse springs of the impulse transmitter (or circuit interrupter, which may take the form of a telephone dial, and which will be referred to as the dial) $c$, the other wire of the line and the right-hand winding of relay A to the other pole of the battery (represented as earth). This causes indicator relay $e$ and relay A to operate. Indicator relay $e$ indicates to the operator by means of any well-known signaling arrangement such as a visual signal that he may proceed to the transmission of the necessary signal and relay A closes an obvious circuit for relay G which operates. The operation of relay G closes a circuit from negative on the chain line joining Figures 1$^a$ and 1, by way of operated contacts of relay G, resistance BKR, unoperated contacts of all relays MK, in parallel, the windings of all relays BK in parallel to earth. Consequently, all relays BK operate. The operation of all relays BK closes two circuits one circuit being from negative on the chain line joining Figures 1$^a$ and 1, extended by way of operated contacts of relay G to the chain line that passes down Figure 1 at the right-hand of relays BK, thence from the point where this chain line joins the full line, by way of unoperated contacts of relay DM to the right-hand contacts of the upper relay BK, through the operated contacts of all relays BK, the winding of relay DM to earth; and the other circuit being from negative, through resistance AR, operated contacts of relay A, unoperated contacts of relay RH, operated left-hand contacts of relays BK to unoperated right-hand contacts of the lowest relay MK, thence through operated contacts of the second relay BK, winding of the bottom relay MK to earth at operated contacts of relay DM. In the above two circuits, relay DM and the lowest relay MK operate. Relay DM closes the following holding circuit for itself from negative on the chain line joining Figures 1$^a$ to 1 and thence in the same circuit as that in which it operated to the point at the bottom of Figure 1 where the chain line joins the full line, then through operated make-before-break contacts of relay DM, resistance DMR, the winding of relay DM to earth. Relay DM also closes all its upper contacts but this has no effect at this time. The lowest relay MK, when it operated, closed a holding circuit for itself as follows:—negative on the chain line to the right of relays BK, through resistance MKIR, operated contacts of the lowest relay MK and of the second relay BK, winding of relay MK, to earth at operated contacts of relay DM. This same (lowest) relay MK also opens the circuit in which the lowest relay BK operated and substitutes the following circuit for the lowest relay BK; negative, through resistance AR, operated contacts of relay A, unoperated contacts of relay RH, operated inner left-hand contacts of all relays BK, operated left-hand contacts of the lowest relay MK, winding of the lowest relay BK to earth. It will thus be seen that the lowest relay MK, which originally depended upon the operation of relay A for its operation, is no longer dependent on that relay but is dependent on the second relay BK remaining operated; and that the lowest relay BK, which was originally independent of relay A is now directly dependent upon that relay remaining operated (these statements deliberately ignore the fact that the whole train of operations is, ultimately, dependent upon the operation of relay A).

All the operations so far described have been brought about by the operation of switch d and will be completed during the time that the operator is setting his dial c which he does when he sees the correct indication upon indicator e. The setting of the dial has no effect upon any of the apparatus other than that of placing a short circuit across the indicator e. This is in order that the resistance of the indicator may not interfere with the transmission of impulses.

When the dial, which is assumed to have been set for the transmission of four impulses, is released it interrupts the line circuit four times and thus causes relay A to release and re-operate four times, its final condition being operated.

The first time relay A releases, it opens the holding circuit of the lowest relay BK which relay, consequently releases. (The circuit of relay G is also broken but this relay is of the retarded release type and remains operated during short interruptions of its circuit.) When, following the release of the lowest relay BK, relay A again operates, a circuit is completed from negative, by way of resistance AR, operated contacts of relay A, operated inner left-hand contacts of all relays BK (except of the lowest of these relays), released left-hand contacts of the lowest relay BK, unoperated right-hand contacts of the second relay MK, operated left-hand contacts of the third relay BK, winding of the second relay MK to earth. The second relay MK operates in this circuit and transfers itself into a holding circuit, which is independent of relay A, as follows: negative on the chain line joining Figures 1a and 1, by way of operated contacts of relay G, winding of relay $DC^2$, operated right-hand contacts of the second relay MK, operated left-hand contacts of the third relay BK, winding of the second relay MK, to earth. The second relay MK, upon operating, also transfers the second relay BK into a holding circuit from negative, through resistance AR, by way of operated contacts of relay A, unoperated contacts of relay RH, operated contacts of all relays BK down to and including the second, unoperated contacts of the lowest relay BK, operated left hand contacts of the second relay MK, winding of the second relay BK to earth. The second relay BK is thus directly dependent upon relay A for its continuing in operated condition.

It was mentioned above that relay $DC^2$ was included in series with the holding circuit of the second relay MK. This relay $DC^2$ operates in this circuit but, beyond connecting up relay $DC^1$ has no effect at this point. Moreover, although relay $DC^1$ is connected into a circuit, from negative, by way of resistance AR, operated contacts of relay A, unoperated contacts of relay RH, operated contacts of relay $DC^2$, impedance DCI and winding of $DC^1$ to earth, it does not operate owing to its being constructed as a retarded operating relay and also owing to the effect of the impedance DCI.

The second time relay A releases, it opens the circuit in which the second relay BK was holding so that this relay releases. The release of the second relay BK by opening its outer left-hand contacts, brings about the release of the lowest relay MK and the release of this relay re-closes the circuit (by way of resistance BKR) for the lowest relay BK. The lowest relay BK, therefore, operates again.

The conditions now are that all relays BK, except the second, are operated and all relays MK except the second are de-energized. Relay $DC^2$ continues energized.

When, following the release of the second relay BK, relay A again operates, a circuit is completed from negative, by way of resistance AR etc., operated inner left-hand contacts of all relays BK down to and including the third, released inner left-hand contacts of the second relay BK, unoperated right-hand contacts of the third relay MK, operated left-hand contacts of the fourth relay BK, winding of the third relay MK to earth. The third relay MK operates in this circuit and transfers itself into a holding circuit which is independent of relay A, similar to that described for the second relay MK. The third relay MK, upon operating also transfers the third relay BK into a holding circuit similar to that described for the second relay BK so that the third relay BK is rendered directly dependent upon relay A for its continuing in operated condition.

The conditions are now that all relays BK, except the second are operated, the third is holding as above described, and all relays MK except the second and third are de-energized. Relay $DC^2$ continues in an operated condition in the holding circuit of the two operated relays MK in parallel.

The third time relay A releases, it opens the circuit in which the third relay BK was holding so that this relay releases. The release of the third relay BK brings about the release of the second relay MK and the release of this relay re-closes the circuit for the second relay BK. The second relay BK, therefore, operates again.

The conditions now are that all relays BK, except the third, are operated and all relays MK, except the third are de-energized. Relay $DC^2$ continues energized.

When, following the release of the third relay BK, relay A again operates, a circuit is completed from negative by way of resistance AR etc., operated inner left-hand contacts of relays BK down to and including the fourth, released inner left-hand contact of the third relay BK, unoperated right-hand contacts of the fourth relay MK, operated left hand contacts of the fifth relay BK, winding of the fourth relay MK to earth. The fourth relay MK operates in this circuit and transfers itself into a holding circuit similar to that described for the second relay MK. The fourth relay MK, upon operating also transfers the fourth relay BK into a holding circuit similar to that described for the second relay BK so that the fourth relay BK is rendered directly dependent upon relay A.

The conditions are now that all relays BK except the third are operated, the fourth is holding as above described, and all relays MK except the third and fourth are de-energized. Relay $DC^2$ continues in an operated condition in the holding circuit of the two operated relays MK.

The fourth time relay A releases it opens the circuit in which the fourth relay BK was holding so that this relay releases. The release of the fourth relay BK brings about the release of the third relay MK and the release of this relay recloses the circuit for the third relay BK, which, therefore operates again.

The conditions are now that all relays BK, except the fourth are operated and all relays MK, except the fourth, are de-energized. Relay $DC^2$ continues energized.

When, following the release of the fourth relay BK, relay A again operates, a circuit is completed from negative, etc., by way of operated inner left-hand contacts of relays BK down to and including the fifth, released inner left-hand contacts of the fourth relay BK, unoperated right-hand contacts of the fifth relay MK, operated left-hand contacts of the sixth relay BK, winding of the fifth relay MK to earth. The fifth relay MK, upon operating also transfers the fifth relay BK into a holding circuit similar to that described for the second relay BK so that the fifth relay BK is rendered directly dependent upon relay A.

The conditions are now that all relays BK except the fourth are operated, the fifth is holding as above described, and all relays MK except fourth and fifth are de-energized. Relays $DC^2$ continues in an operated condition in the holding circuit of the two operated relays MK.

Since the dial, in interrupting the line circuit and reclosing it four times, has now resumed its home or normal position, the line circuit is maintained closed for a sufficiently long period for relay $DC^1$ to operate.

Relay $DC^1$ closes a circuit as follows: negative on the chain line joining Figures 1a to 1, by way of operated contacts of relays G, $DC^1$ and DM, unoperated contacts and winding of relay RH, and operated contacts of relay $DC^2$ to earth. Relay RH operates in the above circuit and holds in the following circuit; negative on the chain line joining Figures 1a and 1, operated right-hand contacts and inner left-hand contacts of relay RH, winding of relay RH to earth at contacts of relay $DC^2$.

Amongst the effects of the operation of relay RH is the withdrawal of negative from the line wire whereby relay A is released and the indicator e is deenergized. The release of relay A brings about the release of relay G. It also opens the holding circuit of the fifth relay BK but this relay has a holding circuit as follows: negative on the chain line joining Figures 1a and 1, outer right-hand contacts of relay RH, resistance RHR, inner right-hand contacts of relay RH, operated inner left-hand contacts of relays BK down to and including the fifth, released left-hand contacts of the fourth relay BK, operated left-hand contacts of the fifth relay MK and winding of the fifth relay BK to earth. The release of relay G opens the circuit in which the remaining operated relays BK were holding but these relays have an alternative holding circuit as follows: negative on the chain line joining Figures 1a and 1, operated outer right-hand contacts of relay RH, resistance BKR and unoperated contacts of the appropriate relays MK.

A further effect of the operation of relay RH is to close a circuit from negative on the chain line joining Figures 1a and 1, by way of outer right-hand contacts of relay RH, operated contacts of relay $DC^1$, upper operated contacts of relay DM, middle left-hand contacts of relay RH, winding of relay MC, to earth at contacts of relay SCO, Figure 1a.

Relay MC operates and completes an obvious circuit for operating the meter relay to record the number of times the transmitted signals are transferred from the BK relay group to the S relay group. Relay MC operates and closes the following circuit: negative on the chain line joining Figures 1a and 1, by way of outer right-hand contacts of relay RH, operated contacts of relay MC to the unoperated right-hand contacts of relay BK6C, by way of resistance $S6R^1$, up a little way, then to the left over the short wire, up again to the operated right-hand contacts of relays BK as far as and including such contacts of the fifth relay BK, unoperated right-hand contacts of the fourth relay BK, the fourth upper pair of contacts of relay DM, the winding of the fourth relay S, Figure 1a to earth. Relay S operates and holds in the following circuit: negative from point 3, by way of unoperated contacts of relay SICO, operated contacts of the fourth relay S, right-hand winding of relay S, unoperated contacts of relay S6C, resistance $S6R^2$, winding of relay SCO to earth.

Relay SCO operates and opens the circuit of relay MC and removes negative from the chain line. The removal of negative from the chain line brings about the release of all relays in Figure 1 and the release of relay MC closes a circuit from negative at point 2, by way of operated contacts of relay SCO, released contacts of relay MC, impedance RBCI, winding of relay RBC to earth. Relay RBC after a delay, operates and reconnects negative to the chain line.

The effect of all these operations is, as has been shown above, that the fourth relay S is operated and this corresponds to the storage of a signal representative of digit 4 or destination Encomiendas. Now since it is assumed that this is the first signal to have been transmitted, there will be no signals stored on relays SI or FI. Consequently none of these relays will be in an operated condition. As soon, therefore, as the fourth relay S shall have closed its holding circuit, and as soon thereafter as relay SCO shall have operated, a circuit will be completed from negative at contacts of SCO, through resistance $SI6CR^1$, right-hand contacts of the fourth relay S, winding of the fourth relay SI, to earth at contacts of relay SICO. The fourth relay SI operates in this circuit and holds in the following circuit; negative from point 4, by way of unoperated contacts of relay FICO, operated contacts of the fourth relay SI, unoperated contacts of relay SI6C resistance $SI6CR^2$, winding of relay SICO to earth.

Relay SICO operates and opens the circuit of the fourth relay S and of relay SCO with the result that these two relays release. The release of relay SCO opens the circuit of relay RBC, which releases, and restores negative to the chain line.

It should be noted that, during the time that relay RBC was operated, this relay supplied negative to the chain line.

The effect of the operation of the fourth relay SI is to store the above-named signal in the second indication position and the effect of the release of the fourth relay S is to remove the signal from storage there.

As soon as the fourth relay SI shall have closed its holding circuit, and as soon thereafter as relay SICO shall have operated, a circuit will be completed from negative at the contacts of relay SICO, through resistance FI6CR$^1$, contacts of the fourth relay SI, winding of the fourth relay FI to earth at contacts of relay FICO. The fourth relay operates in this circuit and holds in the following circuit: negative, button $h$, operated contacts of the fourth relay FI, unoperated contacts of relay FI6C, resistance FI6CR$^2$, winding of relay FICO to earth.

Relay FICO operates and opens the circuit of the fourth relay SI and of relay SICO, with the result that these two relays release. The release of relay SICO opens the circuit of relay SBC, which releases and restores negative to the holding circuit for relays S.

The effect of the operation of the fourth relay FI is to store the above named signal in the first indication position and the effect of the release of the fourth relay SI is to remove the signal from storage there.

When the fourth relay SI was operated and before such relay is released by the operation of relay FICO as previously described, a circuit was closed as follows: negative, by way of unoperated right-hand contact of relay SI6C, right-hand operated contacts of the fourth relay SI, winding of the fourth contactor SIX to earth. This fourth contactor operated and closed circuits from negative, through its two contacts, over the tenth and eleventh conductors, counting from the bottom, extending to Fig. 1$^b$, and through four of the five lamps $b$ in the fourth set, Figure 1$b$ to the common negative battery lead shown connected to all of the lamps. The four lamps are the second, third, fourth and fifth reading from left to right, and these four lamps illuminate the numeral 2 and the name Encomiendas, respectively.

When the fourth relay FI operated a circuit was closed as follows: negative by way of unoperated right-hand contact of relay FI6C, right-hand operated contact of the fourth contactor (from the bottom) FIX to earth. This fourth contactor operated and closed circuits from negative, through its two right-hand contacts, over the tenth and twelfth conductors, counting from the bottom, extending to Fig. 1$^b$, and through the first, third, fourth and fifth lamps in the fourth set, these four lamps illuminating the numeral I and the destination Encomiendas, respectively.

When the fourth relay SI released as a result of transferring the signal to the FI group of relays as previously described it opened the circuit of the fourth contactor SIX and, as a result, this contactor released and opened its circuits to the lamps. Since at this time the signal has been transferred to the fourth FIX relay, as previously described, and the fourth FIX relay has closed somewhat similar circuits, the second lamp, that is the one which was illuminating numeral 2, is the only lamp which is extinguished.

The transmission of a second signal, one represented by nine impulses, will now be described in order to show the operations which are peculiar to some number of digits more than five and also in order to show the effect of having a signal already stored in the apparatus. This operation will not be described as fully as the previous case since it is mainly a repetition of what has already been described.

In the same manner as that in which the fourth relay BK released upon relay A releasing for the fourth time, the fifth, sixth, seventh, eighth and ninth relays BK respectively release upon relay A releasing for the fifth, sixth, seventh, eighth and ninth times.

Immediately the sixth relay BK releases a circuit for relay BK6C is completed as follows: negative on the chain line joining Figures 1$^a$ and 1, by way of operated contacts of relay G, right-hand released contact of the sixth relay BK, the eleventh upper pair of contacts of relays DM, winding of relay BK6C, to earth. Relay BK6C operates and closes a holding circuit for itself which can easily be traced. No further effect is produced by the operation of relay BK6C until, after the completion of the counting operation, relays DC$^1$, RH, and MC operate. As a result of these operations a circuit is completed from negative on the chain line, by way of operated contacts of relay MC, operated contacts of relay BK6C, winding of relay S6C, Fig. 1$^a$, down towards resistance S6R$^1$, to the left along the short wire, up to the right-hand operated contacts of the top relay BK, down to the released right-hand contacts of the ninth relay BK, through the ninth pair of contacts of relay DM, the winding of the fourth relay S, to earth.

Attention is called to the fact that the same relay S is operated in this example as in the former example.

Attention is also called to the fact that in this example relay S6C, instead of resistance S6R$^1$ was included in series with the fourth relay S. This was due to the operation of relay BK6C and constitutes the difference between the two examples.

The holding circuit for the fourth relay S is mainly the same as before but includes the holding winding of relay S6C instead of resistance S6R$^2$.

Due to the completion of this holding circuit and to the consequential operation of relay SCO a circuit is completed as follows: negative, by way of contacts of relay SCO, operated contacts of relay S6C, winding of relay SI6C, operated contacts of the fourth relay S, winding of the fourth relay SI to earth.

Attention is called to the fact that, although the same relay SI is operated in this case as in the previous case, relay SI6C being operated constitutes the difference between the two examples.

Owing to the fact that a signal is already being held on relays FI and to the fact that relays FICO and SIBC are operated, the holding circuit for the fourth relay SI and for relay SI6C is as follows: negative, from point 4, operated contacts of relay SIBC, operated contacts and winding of the fourth relay SI, and of relay SI6C, winding of relay SICO to earth. Relay SICO prepares the following circuit: negative, by way of operated contacts, of relay SICO, operated contacts of relay SI6C, winding of relay FI6C, operated contacts of the fourth relay SI and winding of the fourth relay FI. This circuit cannot, however, be completed as earth is removed due to the operated condition of relay FICO.

Due to the operation of relay SI6C and of the fourth relay SI a circuit is completed as follows: negative, by way of right-hand operated contacts of relay SI6C, third from left pair of contacts of the fourth relay SI, winding of the ninth contactor SIX.

Attention is called to the fact that, whereas in the previous example the fourth relay SI helped in the completion of a circuit for the fourth contactor, in the present example it helps in the completion of a circuit for the ninth. Differentiation is effected by relay SI6C. The ninth contactor SIX completes circuits for the second, third, fourth and fifth lamps in the ninth row, Figure 1b, and these lamps illuminate numeral 2 and the destination C via principal.

From what has been shown, it will be seen that, if a further signal be received on the relays BK, such signal can be transferred to a relay in the S group but cannot proceed into the SI group by reason of relay SICO being operated.

When a signal is being stored on the S relays relay SCO is operated. If a further signal be received in this case, such signal cannot proceed into the S group by reason of relay SCO being operated.

The conditions, as soon as impulsing ceases, are as follows: relay DC$^1$ operates in the circuit described in the first example, and closes a circuit for relay RH from negative at point 2, by way of operated contacts of relay RBC, chain line, operated contacts of relays G, DC, and DM, unoperated contacts and winding of relay RH, to earth at contacts of relay DC$^2$. Relay RH operates and holds as before but relay MC cannot operate since its circuit is opened at contacts of operated relay SCO.

When it is desired to remove the indication from the FI relays, button $h$ is operated. This opens the holding circuit of relays FI and FICO. The latter opens the circuit of relay SI6C and restores earth to the operating winding of relays FI so that the fourth relay FI and relay FI6C operate. Later FICO operates in the holding circuit and thus removes negative from the holding circuit of relays SI. Still later, relay SI6C operates and prepares a substitute holding circuit for relays SI. In the interval, however, between the operation of relays FICO and SI6C, relays SI and SICO release. The effect of this is similar as regards relays S as was that of relays FI as regards relays SI.

During such time as relay RH is operated, that is, until a signal which has been received on relays BK shall have been transferred to relays S, the circuit of relay A, that is the line circuit is open and consequently if the operator closes switch $d$, he will receive no signal on signal $e$. He thus knows that he may not operate the dial.

Figure 3:
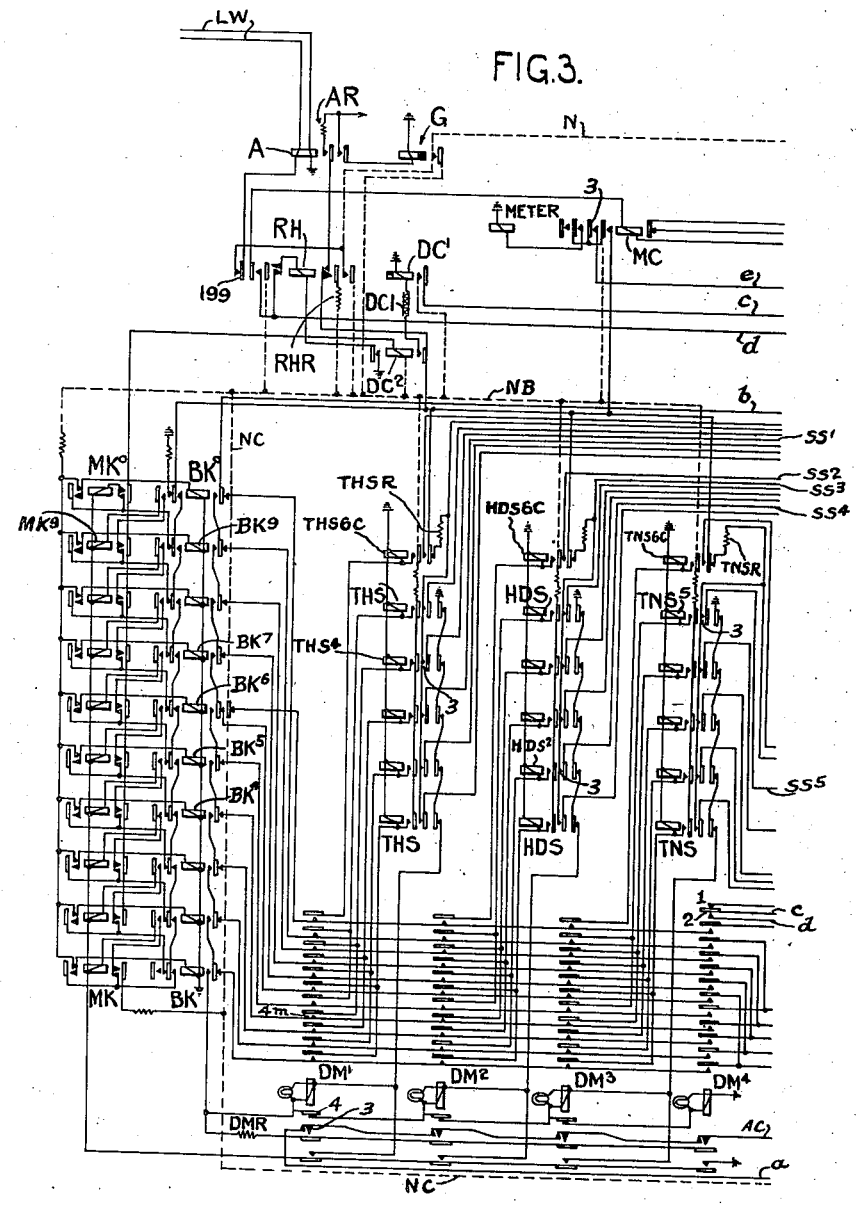

Referring now to Figs. 3, 3a, 3b, 3c and 4, which diagrammatically illustrate a larger or more elaborate embodiment of the invention, for instance for transmitting descriptions of trains from signal cabin to signal cabin on a railway, in this case the recorder relays comprise in addition to the hereinbefore-mentioned BK and MK relays a further set or sets of electro-magnetic contacts or relays, which may be called "Holding" relays; for instance an apparatus designed to deal with say 10,000 descriptions would comprise three sets of holding relays in the recorder, namely a set for the tens digits, which may be called TNS. relays, a set for the hundreds digits, which may be called HDS. relays, and a set for the thousands digits, which may be called THS. relays. In this case a combination of digits, representing the train number or description, is set up on the recorder or BK and MK relays by the electric impulses produced by the operation of the impulse relay A, by means of the transmitting device or dial ($c$, Fig. 1) at the primary control position as hereinbefore-mentioned, and the said number or description is transferred from the recorder relays (BK and MK and TNS., HDS. and THS.) to the storage and indication relays (respectively SS and FS) and from the latter to the auxiliary or final relays (IX) by which the descriptions or indications are directly caused to appear on the indicator. In this embodiment of the invention, however, as the indicator has to display only one description or number at a time, final or auxiliary relays are only associated with or controlled by the group or set of indication relays, which may be called I relays (Fig. 3a) and which correspond to the relays hereinbefore-referred to as the first indication or FI relays shown in Fig. 1a. The set or group of relays corresponding to the second indication or SI relays (see Fig. 1a) of the simpler embodiment of the invention are in the elaborated embodiment the first storage or FS relays (see Fig. 3a), and the group corresponding to the storage or S relays (Fig. 1a) in the simpler embodiment are in the elaborated embodiment second storage or SS relays (Fig. 3a).

It will be understood that in the case of the elaborated embodiment of the invention for transmitting train descriptions to signal cabins, illustrated by Figs. 3, 3a, 3b, 3c, 4, 5, 6 and 7 of the drawings, if descriptions for say four trains are sent from the sending station and received in the instrument at the receiving or intermediate station the descriptions will be received in the order in which they were transmitted to said station, and the first description received will be immediately transferred from the recorder relays, comprising the TNS., HDS. and THS. relays, Fig. 3, through the second storage or SS relays to the first storage or FS relays and from the latter to the indicator of I relays, and these latter relays will operate appropriate auxiliary, final or IX relays (Fig. 3b) thereby causing the indication to be displayed on the indicator; the second and third indications received will, so long as the first indication is displayed on the indicator, be stored respectively on the FS and SS relays, and the fourth indication will be stored on the recorder relays. It will be understood that in ordinary working immediately the first description displayed on the indicator has been erased, for instance either by being transmitted to the next signal cabin, or by being cancelled (which latter would be the case if a train were not proceeding to the next or distant station or cabin), the other descriptions stored as above-mentioned are automatically stepped up from the set of relays on which they were stored to the next set of relays so that the indication which had been stored on the FS relays is now displayed on the indicator.

It is convenient at this point to describe the operation of the apparatus for the receipt and storage of numbers of four digits. Number 4759 will be used by way of example. Relay A (Fig. 3) operates when a key similar to $d$, Figure 1, or its equivalent, is operated and as before brings about the operation of relay G (Fig. 3) and of all relays BK. As a result, a circuit is completed for relay DM¹ as follows: negative, unoperated contacts of relay SSCO, Figure 3ᵃ, chain line N joining this figure to Figure 3, contacts of relay G, chain line NC (Figs. 3 and 3ᵃ), back into Figure 3 over wire AC and through the resting contacts of relays DM⁴, DM³, DM² and DM¹, back into Figure 3ᵃ at *a* and out again at *b*, through the operated contacts of all relays BK, down to and through winding of relay DM¹, unoperated contacts of relays THS to earth. Relay DM¹ operates and by opening contacts 4 prevents other relays DM from operating. It holds in a circuit, similar to that in which it operated, as far as unoperated contacts of relays DM⁴, DM³, DM², and then by way of operated contacts 3 of relay DM¹, resistance DMR, winding of relay DM¹, unoperated contacts of relays THS to earth.

After relay A (Fig. 3) shall have released four times, for digit 4, relay BK⁴ will have been released, and, as relay A remains operated, whilst the dial is being reset, relay DC¹ operates. Relay DC¹ completes a circuit from negative on wire NB, by way of its operated contacts and wire C, down Figure 3ᵃ, by way of unoperated contacts 1 of relay DM⁴ (Fig. 3) up Figure 3ᵃ to *b* and so through the operated contacts of relays BKº to BK⁵, then by way of the released contacts of the fourth relay BK⁴, the fourth upper pair of contacts 4*m* of relay DM¹, winding of the fourth relay THS⁴, to earth. This relay THS⁴, operates, and holds in an obvious circuit.

Attention should be called to the fact that such relays MK as operate during the counting process, depend, for their earth, upon the unoperated condition of all relays THS.

When, therefore, the fourth relay THS4 operates, relay DM1 and such relays MK as are operated release and thus allow all relays BK, or such as have released, again to operate. A circuit, similar to that in which relay DM1 operated is again completed and relay DM2 operates, relay DM1 being, due to the operation of relay THS4, now unable to operate.

As a result of the return to normal of the dial (not shown in Fig. 3 but similar to dial *c* Fig. 1) for the second digit, i. e. digit 7, relay A (Fig. 3) chatters seven times and causes relay DC1 to release. It also causes the first, second, third, fourth, fifth, sixth, and seventh relays BK (counting from the bottom) to release in turn, leaving finally relay BK7 released.

Immediately the sixth relay BK6 released, a circuit was completed from negative on chain line N joining Figures 3ᵃ and 3, by way of operated contacts of relay G, right-hand released contact of relay BK6, operated top pair of contacts of relay DM2, top relay HDS6*c* to earth.

During the resetting of the dial for the third digit, relay A remains operated for sufficiently long to allow relay DC1 to operate so that a circuit, similar to that for relay THS4 is completed for relay HDS2. Relay HDS2 operates and holds in an obvious circuit. When this relay HDS2 operates, relay DM2 and such relays MK as were operated in the counting process release and thus allow all such relays BK as were released again to operate. A circuit, similar to that in which relay DM1 operated is again completed and relay DM3 operates, relays DM1 and DM2 being unable to operate.

As a result of the return to normal of the dial for the third digit, i. e. digit 5, relay A chatters five times and causes relay DC1 to release. It also causes the first to fifth relays BK to release in turn, leaving finally the fifth relay BK5 released.

During the resetting of the dial for the fourth digit, relay A remains operated for sufficiently long to allow relay DC1 to operate so that a circuit, similar to that for the fourth relay, THS4 is completed for relay TNS5. This relay TNS5 operates, and holds in an obvious circuit. When this relay TNS operates, relay DM3 and such relays MK as were operated in the counting process release and thus allow all such relays BK as were released again to operate. A circuit similar to that in which relay DM1 operated, but extending to a direct earth is again completed and relay DM4 operates, the other relays DM being unable to operate.

As a result of the return to normal of the dial for the fourth digit, that is for digit 9, relay A chatters nine times and causes relay DC1 to release. It also causes the first to the ninth relays BK to release in turn, leaving finally the ninth relay BK9 released.

Immediately the sixth relay BK6 released, a circuit was completed from negative on chain line N, by way of contacts of relay G, right-hand released contact of relay BK6, the eleventh pair of upper operated contacts of relay DM4, winding of relay BK6C (Figure 3ᵃ) to earth.

The conditions are now that the relay THS4, relays HDS2 and HDS6*c*, relays TNS5 (Fig. 3), and relay BK6C (Fig. 3ᵃ) are operated, and that all relays BK, except relay BK9, are operated. All relays MK except the ninth and tenth (i. e. relays MK9 and MKo) are de-energized. Relays A, and DC2 (Fig. 3) are operated. An effect of these operations is that digit 4 is recorded on relays THS, digit 7 on relays HDS, digit 5 on relays TNS, and digit 9 on relays BK.

The dial having now resumed its home position, the line circuit is maintained closed for a sufficiently long period for relay DC1 to operate.

Relay DC1 closes a circuit as follows: negative on the chain line N (Fig. 3), by way of operated contacts of relays G, and DC1, wire *c* down Fig. 3ᵃ to the operated contacts 2 of relay DM4, wire *d* (Figs. 3 and 3ᵃ) to unoperated contacts and winding of relay RH (Fig. 3), and operated contacts of relay DC2 to earth. Relay RH operates in that circuit and holds in a circuit from negative on wire NB.

The effects of the operation of relay RH are similar to those described, with reference to Figs. 1, 1ᵃ, 1ᵇ and 2, for the first example. Only the following effect, therefore, need be described in full. A circuit is closed from negative on the chain line N joining Figures 3 and 3ᵃ, by way of outer right-hand contact of relay RH, resistance RHR, inner right-hand contacts of relay RH, unoperated contacts of the relay THS6*c*, wire *ss*¹, Figs. 3 and 3ᵃ, resistance THSR, operated contacts 3 of relay THS4, relay SST4 (Fig. 3ᵃ) to earth. This relay SST4 operates and prepares a holding circuit. This holding circuit is at present open in other places. A second circuit is closed, similar to the above as far as the inner right-hand contacts of relay RH, then by way of operated contacts of the top relay HDS6*c*, wire *ss*², relay SSH6, wire *ss*³, operated contacts 3 of the relay HDS2, wire *ss*⁴ to relay SSH2 (Fig. 3ᵃ) to earth. These relays SSH6 and SSH2 operate and close further points in the holding circuit above referred to. A third circuit is closed similar to the above as far as the inner right-hand contacts of relay RH, then by way of unoperated contacts of the top relay TNS6*c*, resistance TNSR, operated contacts 3 of relay TNS5, wire $ss^5$, winding of relay SST5 to earth. Relay SST5 operates and still further extends the holding circuit.

A further circuit is closed by relay RH, from negative on the chain line N, (Fig. 3), by way of outer right-hand contacts of relay RH, operated contacts of relay DCI, wire c, down Fig. 3ª to upper operated contacts 2 of relay DM4 (Fig. 3), wire d, up Fig. 3ª, middle left-hand operated contacts of relay RH, winding of relay MC, to earth at contacts of unoperated relay SSCO, Fig. 3ª.

Relay MC operates and closes the following circuit: negative on the chain line N by way of outer right-hand operated contacts of relay RH, operated contacts 3 of relay MC, wire e, down Fig. 3ª to operated contacts 2 of relay BK6C (Fig. 3ª), winding of relay SSU6, wire b, operated right-hand contacts of relay BK0 (Fig. 3) unoperated contacts of relay BK9, the appropriate operated contacts of relay DM4, winding of relay SSU4 to earth. These two relays SSU6 and SSU4 operate and complete the holding circuit already referred to. This holding circuit includes relay SSCO (Fig. 3ª) which operates.

The number 4759 is thus transferred from the apparatus shown in Fig. 3 to the group of relays SS (Fig. 3ª). As these relays are in all respects similar to those shown as S in Figure 1ª, except that they are quadruplicated for the storage of a four digit number, further description of the manner in which the signal is passed on to these relays and thence to relays FS and I is not considered necessary. Nor is it considered necessary to show how the apparatus in Figure 3 is released, as this is likewise similar to the manner in which that shown in Figure 1 is released as already described.

Eventually the signal 4759 will be stored on relays I (Fig. 3ª) that is relay IT4 in the top group I, relays IH6 and IH2 in the third group, relay IT5 in the second group and relays IU6 and IU4 in the bottom group will be operated. These relays will hold in the following circuit: negative through contacts o, Figure 3ᶜ and negative through unoperated contacts I of relay SC in parallel, contacts of button p, wire f, Figures 3ᶜ and 3ª, windings and contacts of the respective relays I, up Fig. 3ª to the winding of relay ICO and to earth. The button p is a cancelling button, the operation of which will cancel whatever signal is set up on relays I unless relay S (Fig. 3ᶜ) be operated when an independent negative is connected. The reason for this independent negative is to ensure that the setting of relays I shall not be disturbed during the transmission of an interpolated number or signal, or description, as will later be described.

Each relay I (Fig. 3ª) is adapted to close one or other of two circuits, for one or other of two contactors IX, Fig. 3ᵇ. Which of two circuits shall be closed by any one relay I will depend upon whether the top relay of the respective groups IT, IH, IT, IU, is or is not operated. Thus relay IH2 is adapted to close a circuit for either of the contactors IXH2 or IXH7 depending upon whether relay IH6 is not or is operated. In the example under consideration relays I close circuits as follows: relay IT4 closes a circuit from negative, by way of contacts 4 of unoperated relay I6 and 3 of operated relay IT4 to a wire in cable g for contactor IX4, Fig. 3ᵇ: relays IH6 and IH2 close a circuit from negative, by way of contacts 3 of operated relay IH6 and 2 of operated relay IH2 to a wire in cable h for contactor IXH7: relay IT5 closes a circuit by way of contacts 4 of unoperated relay IT6 and 3 of operated relay IT5 to a wire in cable i for contactor IXT5: and relays IU6 and IU4 close a circuit from negative, by way of contacts 3 of operated relay IU6 and 2 of operated relay IU4, to a wire in cable j for contactor IXU9. These circuits are by way of the upper windings of the respective contactors and then by way of the respective resistances IXRI, wire k w to earth at resting contacts of relay S (Fig. 3ᶜ). Lamps 4, 7, 5 and 9 associated with these contactors will, therefore, glow and the number 4759 will be displayed on the indicator.

The receiving apparatus at the signal cabins in this case comprises, in addition, a transmitting device which may be a dial (see Fig. 3ᶜ) and which is operated by the signalman, for instance in a similar manner to the dial or transmitting device (c, Fig. 1) at the original or primary sending station, i. e. the dial is revolved to a stop position and released. This operation of the dial (Fig. 3ᶜ) transmits to the next or distant signal cabin the number or description of the train which is proceeding to the said cabin and erases the said description from the indicator in the intermediate cabin, the description received at the distant cabin being either stored or displayed according to whether other trains are already in the section between the intermediate and distant cabins or whether the train in question is the only one in the section. If, however, the apparatus at the distant cabin is full up (i. e. its capacity is occupied by train descriptions) the said dial or transmitting device (Fig. 3ᶜ) when operated by the signalman in the intermediate cabin becomes automatically locked, for instance by means of an electro-magnetic lock, and cannot return to its normal or initial position and therefore cannot transmit the required electric impulses to the apparatus in the distant cabin for setting up therein a description or number of a train. When, however, the apparatus at the distant cabin is in condition to receive a description the dial of the apparatus at the intermediate cabin is automatically released and in its return to normal transmits, through appropriately arranged contacts and circuits controlled thereby (which may include relays) the required impulses to the distant cabin apparatus. These impulses are transmitted to the apparatus at the distant cabin through two line wires as is the case with the impulses set up by operation of the dial c (Fig. 1) at the originating or primary control station.

The above-mentioned lock on the transmitting device or dial may comprise a disc e, see Fig. 3ᶜ, connected with the dial and having on it a piece f of soft iron which, on the dial being revolved by the signalman, comes into position against the above-mentioned locking electro-magnet g, and until the apparatus at the distant cabin is in condition to receive an indication or description the dial is locked in its set position (i. e. the position to which it was turned by the signalman) from which it is released by current energizing a line relay L which breaks the circuit of the locking device de-energizing it and releasing the soft iron lock piece f and consequently releasing the dial which, as hereinbefore-mentioned, in its return movement to normal transmits impulses, corresponding to the number or description of the train, to the distant cabin, and cancels the said description from the indicator in the intermediate cabin.

Figure 4:
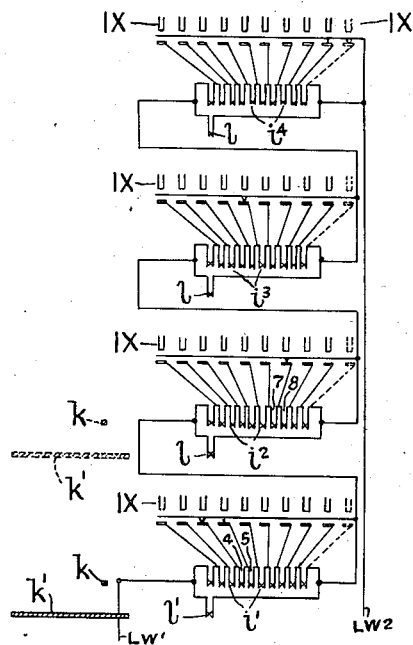
Fig. 4 is a diagrammatic showing of the contacts of the dial device for transmitting electric impulses from the apparatus at an intermediate signal cabin to the apparatus at the next cabin.

The above-mentioned dial device for transmitting the electric impulses from the apparatus at one signal cabin to the apparatus at the next cabin may comprise four sets or groups of contacts $i$, see Figs. 3c and 4, each set comprising ten pairs of contacts or impulsing springs, one set for units, one set for tens, one set for hundreds and one set for thousands, and the dial has on it or appropriately associated with it two wipers or cams of insulating material one, $k$, for actuating the pairs of contact springs $i$ of said sets and the other cam or wiper $k^1$, for actuating pairs of short-circuiting springs $l$ there being a pair of these short-circuiting springs in parallel with each set or group $i$ of the aforesaid contact or impulsing springs. On the cams $k$ and $k^1$ passing clear of the springs of the first set of contact or impulsing springs $i$ the short-circuiting springs $l$ of this set are closed, and as the disc rotates the cams repeat the operation on each succeeding set of impulsing and short-circuiting springs $i$, $l$. Another disc $m$ on or associated with the dial has a cam or projection $n$ which as a last operation, in the return of the dial to the normal position, opens a pair of contacts $o$, Figs. 3c and 7, in the circuit of the indicating relays, I, Fig. 3a, thereby cancelling the indication displayed at the intermediate cabin or station and which, by the operations just described, has been transmitted to the next or distant cabin or station. Should there be another indication which was set up and stored on the first storage or FS relays of the apparatus in the intermediate cabin this indication will, as already described, automatically pass on to the indicating or I relay system and through operation of the final or IX relays, will be displayed on the indicator in the intermediate cabin. The disc $e$, in addition has a cam or projection $f$, which when the dial device is in its normal, unoperated, position opens the sets of springs Y1, Y2, and which, when the dial device is in its fully operated position closes the sets of contacts Z1 and Z2. This cam $f$ is of magnetic material and, in the operated position of the dial device, is adjacent to the electro-magnet $g$ which is in a circuit derived from negative at a resting contact on relay L. Thus, until relay L is operated, the dial device will be held in its operated position once it shall have been set into that position.

In operation the above-mentioned dial is moved from its normal or rest position through its full movement until stopped by a stop, and the cams or wipers $k$ and $k^1$ in this movement have no effect on the contact springs. For instance the dial mechanism or arrangement may be such that the wipers or cams are free of the dial during the forward movement from normal position and only become operatively connected with the dial on the return movement. On release of the dial after completion of its forward movement it returns to its original position and in this return movement the cams become operative and act on successive pairs of contact springs $i$ whereby a number of impulses are sent to the distant cabin or receiving station until the pair of contact springs appertaining to an operated relay of the final or IX relays has been passed, the remaining contacts being short-circuited by the contacts of the said operated relay and thus being incapable of sending impulses. This will be readily understood by reference to Fig. 4 which shows relays IX operated for the number 4759 displayed on the indicator (Fig. 6) at the intermediate cabin and, by the above described operation of the contact springs $i$, transmitted to the receiving apparatus at the distant cabin.

The cam $k^1$ in connection with the dial and appertaining to the short-circuiting springs or contacts $l$ is so arranged that, in the return of the dial from its operated to its normal or initial position for producing impulses and thus transmitting the train number or description from the intermediate cabin to the distant signal cabin as above described, the said cam operates the short-circuiting contacts $l$ shortly before the cam $k$ appertaining to the impulsing springs or contacts $i$ reaches and operates the impulsing springs, these operations of the cams being repeated on the several groups or sets of the contacts or springs $i$ which are successively operated in the return movement of the dial. The arrangement as shown is such that the cam $k^1$ will open the short-circuiting springs or contacts $l$ shortly before and close them shortly after the cam $k$ operates the impulsing springs or contacts $i$.

The operations for the example 4759 are as follows. The operator moves the dial, to which discs $e$ and $m$ and cams $k$ and $k^1$ are coupled as described elsewhere, in the direction of the arrow to its set position, that is until further rotation is stopped by finger stop ($fs$ Fig. 5) whereby a circuit is completed from negative, by way of the winding of relay SC, Fig. 3c, contacts Y2, and Z1 to earth. Relay SC operates and opens the holding circuit for relays I at one of the points i. e. contact 1, above referred to. It also closes a circuit from negative by way of unoperated contacts of relay L, electromagnetic lock $g$, contacts Z2, to earth. Assuming that the apparatus at the distant station is able to accept a signal, a circuit will be completed from line wire LW1 by way of relay L, contacts of relay SC, contacts $l$ (in series) of the dial, to line wire LW2. Relay L operates and releases the electro-magnetic lock whereby the dial returns to normal under the action of a clock spring, for instance. In returning, the dial carries with it cam $k^1$, which opens contacts $l^1$. The line circuit, however, remains continuous through contacts $i$ of group $i^1$ in series and in series with contacts $l^2$, $l^3$ and $l^4$. Eventually cam $k$ (Figs. 3c or 4) opens the first pair of contacts in group $i$ and thus transmits one impulse that is, opens the line circuit once. Cam $k$ then opens the second, third and fourth pairs of contacts in group $i^1$ and thus transmits second, third and fourth impulses. Cam $k$ continues to open the remaining contacts in the group $i^1$ in turn, but produces no further interruptions of the line circuit, by reason of the fourth relay IX, that is relay IX4 being operated and completing the line circuit as follows: line wire LW1, relay L, contact of relay SC, contacts $l^4$, $l^3$, and $l^2$, wire $t^1$, Figs. 3c and 3b to operated contacts 4 of contactor IX4, and the wire associated with it to the point between springs 4 and 5 of group $i^1$, $i$. This constitutes a short circuit across the remaining contacts of group $i^1$. Eventually cam $k$ passes out of the range of contacts $i^1$ and then cam $k^1$ passes out of contact $l^1$. This and the following description can be read in connection with Figures 3c and 3b, or Fig. 4.

Continuing their motions, cam $k^1$ opens the pair of springs $l^2$, thus removing a short circuit from across the second set of springs $i^2$, and cam $k$ successively opens the springs of group $i^2$. In opening the first, second, third, fourth, fifth, sixth and seventh springs, cam $k$ interrupts the line circuit seven times, but in opening the remaining springs $i^2$ no interruptions of the line circuit are effected by reason of there being a short circuit across these springs as follows: line wire LW1, relay L, contacts of relay SC, fourth and third springs $l^4$ and $L^3$, wire $uw$, operated contacts of the seventh relay IXH, that is relay IXH7, its appropriate wire to the point between contacts 7 and 8 of contacts $i^2$, the first set of springs, $l^1$, to line wire LW2.

It can, from the above, be seen how the cams, operating upon the third and fourth sets of springs $i$, that is on springs $i^3$ and $i^4$, send five and nine impulses, respectively, for the third and fourth digits.

When the dial shall have almost reached its home position, cam or projection $n$ on disc $m$ momentarily opens contacts O and opens the holding circuit, already described, for relays I (Fig. 3a) at the second point. These relays consequently release. Eventually the dial reaches its home position and piece $f$ opens contacts $Y^2$, thus releasing relay SC.

It may happen that a train, a description of which is stored on relays I and displayed on the lamps associated with contactors IX (Fig. 3b) is not required to proceed to the next station. For instance, the train of which it is a description may have to be diverted into a siding or on to another track. Under these conditions the description may be erased or cancelled from the indicator instead of being transmitted. This is effected by pressing button $p$ (Fig. 3c) which, it will be recalled, is included in the holding circuit of relays I (Fig. 3a).

As soon as relays I release, whether their holding circuit is opened as a result of transmission of a description or as a result of the operation of button $p$ for the purpose of cancellation, the appropriate description is, by the release of relays I, removed from the IX relays, Fig. 3b, and, moreover, if there is a description stored on relays FS (Fig. 3a) it is transferred to relays I as already described.

It may, further, happen that a train, the description of which is not stored on relays I, is required to proceed to the next station. For instance, a train may come out of a siding, or from another track. Under these circumstances a description which is being displayed on the lamps of the indicator by the contactors IX may be suppressed without being, as described in the preceding two paragraphs, entirely cancelled from the relays I and a new description, that of the extra train, may be interpolated by being manually set up on the contactors IX. For this purpose the contactors are provided with a second winding and have associated with them the set up buttons $u$.

Suppression of an existing description is effected by operating button $s$, Fig. 3c. Hereby circuits are completed from negative, through relay S, right-hand contacts of button $s$ to earth at contacts of relay SC, and from negative through relay SX, left-hand contacts of button $s$ to the same earth. Relay S connects negative to wire $f$ thus providing a holding circuit for relays I (Fig. 3a) which is independent of springs O and of the contacts of relay SC. Relay S also provides a holding circuit for itself as follows: negative, relay S, operated contacts 2 of relay SX, operated contacts 1 of itself and unoperated contacts of button $r$ to earth. There is an alternative holding circuit, independent of button $r$ or relay SX, as follows, negative, relay S by way of contacts Y1 of the dial, contacts 1 of relay S, wire $sh$, to earth at contacts of relay SC. This will be closed as soon as the dial is moved from home position and relay SC operated and is to prevent interference with transmission of an interpolated description during transmission.

Relay SX holds in the following circuit: negative, by way of resting contacts of relay SC, inner contacts of relays SX and S, to earth at contacts of button $r$.

Further effects of the operation of relay S are the removal of earth from wire $kw$ whereby any operated contactors are released, and the connection of negative to wire $v$.

The original description having been removed from the contactors, the operator proceeds to set up a new description, say 1357 as follows: He presses button $u1$ in the top row, $u3$ in the second row, $u5$ in the third row, and $u7$ in the bottom row. Circuits are thus completed from negative on wire $v$, to wire $w$, thence splitting at the four unoperated contacts of relay SCX, to operated contacts of $u$ buttons $u1$ in the top row, $u3$ in the third row, $u5$ in the second row, $u7$ in the bottom row, through the lower windings of contactors IX1, IXH3, IXT5, and IXU7, resistances IXR2, buttons $q$, and joining at wire $xw$ (Figs. 3b and 3c) over which the circuit continues to earth at button $r$. The buttons $q$ thus provide a ready means for removing an incorrectly set up digit in their respective rows, and the button $r$ provides a ready means of removing an incorrectly set up number.

The operated contactors close holding circuits for themselves from negative on wire $v$, by way of their operated contacts and lower windings, through resistances IXR2 to earth at contacts of button $r$.

When the dial is operated, in addition to the operations already described, a circuit is closed by relay SC from earth at its contact 4, over wire $scx$ for relay SCX (Fig. 3b) which operates and provides a holding earth for the contactors, this earth being independent of button $r$. Relay SCX also removes negative (at wire $w$) from the $u$ button. Thus the signalman cannot interfere with a number once a transmission shall have started.

When the dial reaches its home position, it opens contacts Y1 thereby releasing relay S, and opens contacts Y2 thereby releasing relays SC and SCX. Relay SCX opens the holding circuit of the contactors, and relay S restores earth to wire $kw$ so that the contactors again come under the influence of, and can again be operated by, relays I.

It is convenient, at this point, to refer briefly to the apparatus shown in Fig. 3b which is the indicator apparatus. This apparatus is operated from the group of relays I, Fig. 3a, upon which a number, transmitted from a preceding station, is stored prior to its being transmitted to a next or succeeding station, in the following manner:— A relay in each of the four sub-groups of relays comprising the group I being operated, a circuit is completed from negative, over an appropriate wire in the four cables (which leave Fig. 3a at the right thereof and which enter Fig. 3b at the left thereof) through a relay in each of the groups of relays IX through the four resistances IXR1 to a common wire $kw$ which, leaving Fig. 3b at the bottom left hand corner thereof and entering Fig. 3c at the top left-hand corner thereof, (the second such wire from the left) finds earth at a resting contact on relay S. These relays close circuits for their appropriate lamps and also mark appropriate wires leading to the transmitter, Fig. 3c.

Any appropriate form of indicator may be employed for displaying the train descriptions or numbers in the signal cabins. For instance in one embodiment, shown in Fig. 5, the indicator may comprise a panel $t$ on which there may be say four vertical columns of digits 1–9 and 0 with arrow-heads pointing to the digits; these digits and arrow-heads may be stencil-cut in metal plates let in the panel. The digits may be arranged to be coloured by a backing strip or piece and the arrow-heads to be individually illuminated as required by means of electric lamps behind each arrow-head, the circuits of which lamps are controlled by the hereinbefore-mentioned IX relays. Each lamp would be enclosed in its own light-tight casing so that it will illuminate only the arrow-head to which it appertains. The hereinbefore-mentioned rows of buttons $u$ for setting up a number of an interpolated train may be arranged in vertical rows $u$ adjacent to the columns of digits and arrow-heads; the remaining buttons $q$, $r$, $s$ and $p$ for effecting the cancelling and suppressing operations hereinbefore-mentioned may be appropriately arranged on the panel. The panel may, if desired, form the front of a casing enclosing the IX relays, and the transmitter or dial hereinbefore described with reference to Figs. 3c and 4, for transmitting train descriptions from cabin to cabin as hereinbefore-mentioned, may also be arranged on the panel or front of this casing as indicated at $v$, Fig. 5. If desired the casing may contain other parts of the apparatus.

Referring to the transmitting apparatus or "dial", illustrated diagrammatically in Figs. 3c and 4 of the drawings and comprising the parts $e$ and $m$, respectively, carrying the lock piece $f$ and cam or wiper $n$, and the parts carrying the cams or wipers $k$, $k^1$, these parts may be mounted on a common shaft or axis and a free-wheel mechanism may be arranged in association with the said parts the free-wheel mechanism being such that on movement or rotation of the parts $e$, $m$ from the normal or rest position to the off-normal position no movement will be given to the part on which the cams or wipers $k$, $k^1$ are fixed, but on the return movement of the parts $e$, $m$ to normal a driving connection is made, through the free-wheel mechanism, between the parts $e$, $m$ and the part on which the cams $k$, $k^1$ are mounted so that this part will be rotated about its axis through a complete revolution during which the contact springs $l$ and $i$ will be actuated as hereinbefore described, the free-wheel mechanism comprising gearing whereby this complete revolution will be given to the part carrying the wipers $k$, $k^1$ notwithstanding that the parts $e$, $m$ are not moved through a complete revolution. As an alternative to the arrangements just described, the parts $e$, $m$ and the parts carrying the cams or wipers $k$, $k^1$ might be all fixed on the shaft and the cams $k$, $k^1$ and contact springs $l$ and $i$ appropriately designed or arranged so that in the movement from the normal to the off-normal position the said contact springs will not be opened by the cams or wipers $k$, $k^1$ but the said contacts will be opened in the return of the parts to the normal position.

Figure 6:
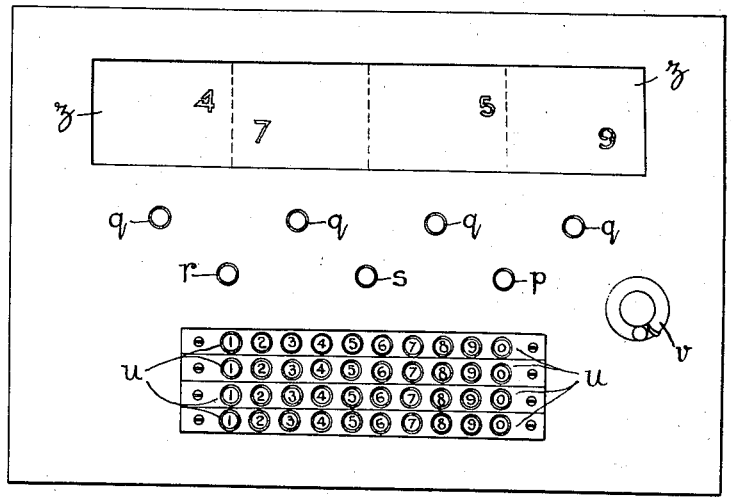

Instead of the indicator panel hereinbefore described with reference to Fig. 5 of the drawings, the panel illustrated in Fig. 6 may be employed in which the indicator marked $z$, on which the numerals or digits of the number to be displayed are caused to appear as hereinbefore described, is of the known type employed in automatic telephone systems, i. e. a number of sets or groups of numerals or digits 1 to 9 and 0 are provided each group in its own compartment in the panel and a set or group of electric lamps associated with each group of digits in a compartment, the form and arrangement of the digits and lamps being similar to those employed in the known telephone number indicators.

Although I have described and shown in the drawings sets or groups of electric relays and contacts controlled thereby as the means for recording, storing and causing the display of signals or descriptions received at a station or in a signal cabin, it will be readily understood that rotary line selector switches (such, for example, as those illustrated in Figs. 615 and 616 on page 698 in "The Practical Telephone Handbook" by Joseph Poole, seventh edition published by Isaac Pitman and Sons Ltd. of London, England, and New York, U. S. A.) adapted to be actuated by a succession or by one or more series of electric impulses may be employed for effecting the operations in the receiving apparatus instead of the said sets or groups of relays and their contacts.

The apparatus according to this invention reduces the number of line wires between the apparatuses at stations or signal cabins which in the embodiments illustrated can be worked with only one pair of line wires for the up track and one pair for the down track. If desired, however, the system can be worked with only one line wire for each direction of traffic; for instance, referring to Fig. 1 of the drawings, if instead of (as shown) relay A having two windings in series this relay is provided with but one winding connected between the contacts of RH and the line, and an earth return is provided at the primary control station or position, instead of (as shown) at relay A, a single line wire for each direction of traffic will suffice. Further, the power consumption is small and can be obtained from relatively small batteries which can be charged from any convenient power supply circuit, using a simple rectifier in the case of alternating current. Further, as hereinbefore mentioned, the apparatus is such that it occupies but small, or relatively small, space; for instance, an apparatus according to this invention capable of dealing with a very large number of train descriptions, for instance ten thousand descriptions, would occupy much smaller space than would be required in the case of train describing apparatus of the kind heretofore proposed and employed.

The apparatus according to this invention is also very flexible inasmuch as it can be readily adapted to deal with various conditions or requirements existing or arising in the transmission and indication of train descriptions and like operations. Transmission at a junction, or in the case of trains crossing over from main to local lines, can be readily provided for, the selection of circuits for these purposes being controlled, for example, by a few contacts on the point levers. Further, in the case of indicating on a platform indicator the destinations or descriptions of trains approaching a station the apparatus can be readily adapted to simultaneously give a series of indications at a number of stations along the line.

What I claim is:—

1. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator, a similar receiving apparatus at a distant receiving station; means at said first station, automatically controlled by the display means of each signal when active, for retransmitting said signals from the first station to the receiving apparatus in the distant station after said signals have been displayed on the indicator in the first station, and means responsive to the retransmission of each of said signals for cancelling the display of such signals from the indicator in the first station.

2. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator, a similar receiving apparatus at a distant receiving station; means at said first station, automatically controlled by the display means of each signal when active, for retransmitting said signals from the first station to the receiving apparatus in the distant station after said signals have been displayed on the indicator in the first station, and means at said first receiving apparatus for cancelling without retransmitting a signal on display relating to a train which is not to proceed to the distant station.

3. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator, a similar receiving apparatus at a distant receiving station; means at said first station, automatically controlled by the display means of each signal when active, for retransmitting said signals from the first station to the receiving apparatus in the distant station after said signals have been displayed on the indicator in the first station, means responsive to the retransmission of each of said signals for cancelling the display of such signals from the indicator in the first station, and means at said first receiving apparatus for cancelling a signal on display that is not to be transmitted from said first receiving apparatus.

4. In a train describing system, a receiving apparatus including an indicator for describing and displaying signals indicating the movement of trains, a first, a second, and a third apparatus in said receiving apparatus, means for transmitting a train signal to the first apparatus, means in the first apparatus for automatically transferring said signal to the second apparatus, means in the second apparatus for automatically transferring said signal to the third apparatus, said first and second apparatus freed for receipt of further signals responsive to the transferring of said signal, means in said third apparatus for displaying said signal on said indicator, a similar receiving apparatus at a distant station; means at said first receiving apparatus, automatically controlled by the display means of each signal when active, for retransmitting said signal to the receiving apparatus in the distant station, means for cancelling the display of said signal from the said indicator responsive to the retransmission of said signal, and means for cancelling without retransmission a signal on display in case such signal is not to be retransmitted from the first receiving apparatus.

5. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator, a similar receiving apparatus at a distant receiving station; means at said first station, automatically controlled by the display means of each signal when active, for retransmitting said signals from the first station to the receiving apparatus in the distant station after said signals have been displayed on the indicator in the first station, and means at said first station for interpolating between a previously displayed signal and the signal at the time on display the display of a new train signal on said indicator, and said retransmitting means thereafter effective for transmitting said new train signal to the receiving apparatus in the distant station.

6. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator, a similar receiving apparatus at a distant receiving station; means at said first station, automatically controlled by the display means of each signal when active, for retransmitting said signals from the first station to the receiving apparatus in the distant station after said signals have been displayed on the indicator in the first station, means at said first station for suppressing without cancelling a displayed signal from said indicator, means for interpolating a new train signal and for displaying the same on said indicator in place of said suppressed signal displayed, said retransmitting means thereafter effective for retransmitting said new signal to the receiving apparatus in the distant station, and said cancelling means at said first station responsive to the retransmission of said new signal for cancelling the display of such signal from the indicator in the first station.

7. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator, a similar receiving apparatus at a distant receiving station; means at said first station, automatically controlled by the display means of each signal when active, for retransmitting said signals from the first station to the receiving apparatus in the distant station after said signals have been displayed on the indicator in the first station, means responsive to the retransmission of each of said signals for cancelling the display of such signals from the indicator in the first station, means at said first receiving apparatus for cancelling a displayed signal that is not to be transmitted from said first receiving apparatus, means at said first station for suppressing without cancelling a displayed signal from said indicator, means for interpolating a new train signal and for displaying the same on said indicator in place of said suppressed signal, said retransmitting means thereafter effective and controlled in accordance with the display of the new signal for retransmitting said new signal to the receiving apparatus in the distant station, and said cancelling means at said first station responsive to the retransmission of said new signal for cancelling the display of such signal from the indicator in the first station.

8. In a train describing system, a receiving station having a receiving apparatus and an indicator for receiving, storing, and displaying a plurality of train signals, a similar receiving apparatus at a distant station for receiving and storing a plurality of train signals, means for successively transmitting a plurality of different train signals to said first receiving apparatus, means including said receiving apparatus at said first station controlled in accordance with each displayed signal for retransmitting said signals after the same have been displayed to the receiving apparatus at the distant station, and means for preventing the retransmission of a displayed train signal from the first station in case the receiving apparatus at the distance station is full and has no capacity for receiving another signal and for automatically rendering said retransmitting means effective to transmit such signal when said receiving apparatus in the distant station becomes free to receive another signal.

9. In a train describing system, a receiving station having a receiving apparatus and an indicator for receiving, storing, and displaying a plurality of train signals, a similar receiving apparatus at a distant station for receiving and storing a plurality of train signals transmitted from the first station, means for successively transmitting a plurality of different train signals to said first receiving apparatus, means including said receiving apparatus at said first station controlled in accordance with each displayed signal for retransmitting said signals after the same have been displayed on said indicator to the receiving apparatus at the distant station, and electro-mechanical locking means automatically locked for preventing the retransmission of a displayed train signal from the first station in case the receiving apparatus in the distant station is full and has no capacity for receiving another signal and automatically unlocked when the receiving apparatus in the distant station becomes free to receive another signal to permit the retransmission of said signal.

10. In a train describing system, a receiving station having a receiving apparatus and an indicator for receiving and storing a plurality of train signals, a similar receiving apparatus at a distant station for receiving and storing a plurality of train signals transmitted from the first station, means for successively transmitting a plurality of different train signals to said first receiving apparatus, relays in the receiving apparatus at the first station operable in accordance with said received and stored signals for operating said indicator to display said signals, means including keys for operating said relays to set up and display an interpolated train signal on said indicator between two prior transmitted train signals, and means including said receiving apparatus at said first station controlled in accordance with each displayed signal for retransmitting all of said signals which are displayed on said indicator.

11. In a train describing system, a receiving station having a receiving apparatus and an indicator for receiving, storing, and displaying a plurality of train signals, a similar receiving apparatus at a distant station for receiving and storing a plurality of train signals transmitted from the first station, means for successively transmitting a plurality of different train signals to said first receiving apparatus, means for suppressing the display on said indicator of one of said displayed signals, means for setting up and displaying on said indicator a new train signal in the place of said suppressed signal, means including said first receiving apparatus controlled in accordance with said new displayed signal for transmitting the new train signal to the receiving apparatus in the distant station, and means responsive to the transmission of said signal for again displaying said suppressed signal on said indicator.

12. In a train describing system, a receiving station having a receiving apparatus and an indicator, means for transmitting a train signal to said receiving apparatus, means in said apparatus for storing said transmitted signal without displaying the same in case another prior signal is on display on the indicator, means for removing said other displayed signal from said indicator, means in said apparatus for thereafter automatically displaying said stored signal on said indicator responsive to the removal of said other displayed signal, a similar receiving apparatus at a distant receiving station, means at the first station including said displaying means controlled in accordance with the signal at this time on display for retransmitting said displayed signal to the distant receiving apparatus, and means for preventing the retransmission of said displayed signal in case said distant receiving apparatus is full and has no capacity for receiving another signal.

13. In a train describing system, a receiving apparatus including an indicator for describing and displaying signals indicating the movement of trains, a first, a second, and a third apparatus in said receiving apparatus, means for transmitting a single train signal to the first apparatus, means in said first apparatus for automatically transferring said signal to said second apparatus only in case a prior signal is not stored thereon, means in said second apparatus for automatically transferring said transmitted signal to the third apparatus only in case a prior signal is not stored thereon, means in said third apparatus for automatically transferring said signal to said indicator only in case a prior signal is not displayed thereon, means for automatically freeing said first apparatus for receipt of a further signal responsive to its transfer of said signal; means for automatically freeing said second apparatus for receipt of a further signal in response to its transfer of said signal, and means in said indicator for displaying said signal.

14. In a train describing system, a receiving apparatus including an indicator for describing and displaying signals indicating the movement of trains, a first, a second, and a third apparatus in said receiving apparatus, means for transmitting a train signal to the first apparatus, means in said first apparatus for automatically transferring said signal to said second apparatus only in case a prior signal is not stored thereon, means in said second apparatus for automatically transferring said transmitted signal to the third apparatus only in case a prior signal is not stored thereon, means in said third apparatus for automatically transferring said signal to said indicator only in case a prior signal is not displayed thereon, means for automatically freeing said first and second apparatus for receipt of further signals in response to the transferring of said signal, means in said indicator for displaying said signal, a similar receiving apparatus at a distant station, means at the first receiving station controlled in accordance with a signal on display for retransmitting said displayed signal to the receiving apparatus in the distant station, and means for cancelling the display of said signal from said indicator responsive to the retransmission of said signal.

15. In a train describing system, a receiving apparatus comprising a first group of relays for setting up train signals, a second group of relays for storing said signals, and a final group of relays for describing and displaying the movement of trains in accordance with said signals, means for transmitting a train signal consisting of one or more impulses to the first group of relays to operate certain of said relays in accordance with the transmitted signal, circuits controlled by the operated first group relays for setting up such signal, auxiliary circuits also controlled by the operated first group relays for automatically transferring said signal to the second group relays to operate certain of said second group relays in accordance with said signal when the signal is fully set up, circuits controlled by the operated second group relays for storing said signal and for automatically transferring said signal to the final relay group to operate certain of said final group relays in accordance with said signal when the signal is fully stored, said first and second group relays freed for receipt of further signals responsive to the transferring of said signal, and circuits controlled by the operated relays in said final relay group for displaying said signal.

16. Signaling apparatus for the purpose set forth, including signal-receiving, storing and display apparatus; in combination with means for suppressing a displayed signal from said display apparatus while maintaining such signal stored on said storing apparatus, means for then interpolating on said display apparatus another signal ahead of the said suppressed signal, a signal-receiving, storing and display apparatus at a distant signal cabin, transmitting means controlled in accordance with the said interpolated signal now on display for transmitting the said interpolated signal to said receiving, storing and display apparatus at the distant cabin, and means controlled by the operation of the said transmitting means for again displaying the suppressed signal on the display apparatus from which is was suppressed.

17. In a train describing system, a receiving station having a train signal receiving apparatus and an indicator, means for successively transmitting a plurality of different train signals to said receiving apparatus, each signal indicating the movement of a different train, means in said apparatus for storing a plurality of said transmitted signals, means in said apparatus for thereafter successively displaying said stored signals on said indicator and for successively erasing said displayed signals, a similar receiving apparatus at a distant receiving station; and means at said first receiving station, automatically controlled in accordance with each signal by its display means when active, for retransmitting the displayed signal from the said first receiving station to the signal receiving apparatus in the distant station.

JOSHUA HEAP GRAHAM.